Figure 1:
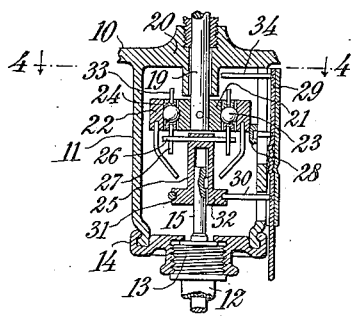

W. G. SHELTON.
TRANSMISSION MECHANISM.
APPLICATION FILED OCT. 23, 1913.

1,201,364.

Patented Oct. 17, 1916.

WITNESSES:
René Bruine
Fed White

INVENTOR:
William G. Shelton,
By Attorneys,
Fraser, Turk & Myers

UNITED STATES PATENT OFFICE.

WILLIAM GENTRY SHELTON, OF NEW YORK, N. Y.

TRANSMISSION MECHANISM.

1,201,364.  Specification of Letters Patent.  Patented Oct. 17, 1916.

Application filed October 23, 1913. Serial No. 796,892.

*To all whom it may concern:*

Be it known that I, WILLIAM GENTRY SHELTON, a citizen of the United States, residing in the borough of Manhattan, city, county, and State of New York, have invented certain new and useful Improvements in Transmission Mechanism, of which the following is a specification.

This invention relates to and has for an object to provide a light and serviceable transmission mechanism, preferably reduction, one of the objects of the invention being to utilize a device resembling in form a self-contained ball bearing for a transmission mechanism. In practice I have used a commercial ball bearing for the reduction transmission, that illustrated being a commercial self-contained ball bearing.

The present improvement is particularly useful in connection with light mechanism wherein the power shaft is driven at a high rate of speed and wherein the spindle is required to rotate at a materially less rate of speed.

The mechanism shown, described and claimed herein was divided from my co-pending application, Serial No. 754,918, filed March 17, 1913 for dental engines, and Serial No. 765,263, filed May 3, 1913 for "dental engines."

In the drawings accompanying this specification a practicable embodiment of the invention is illustrated, wherein—

Figure 2:
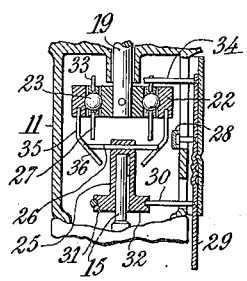
Figure 3:
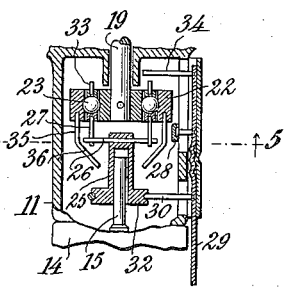
Figure 4:
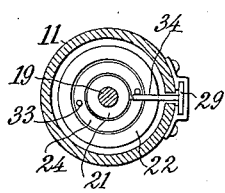
Figure 5:
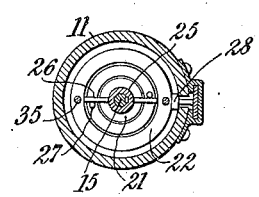
Figure 6:
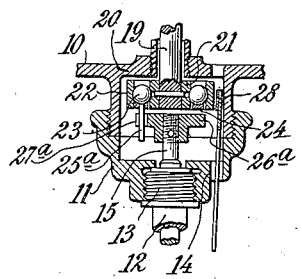

Figure 1 is a central longitudinal section, partly in elevation; in this view the transmission mechanism is shown in the forward driving position. Fig. 2 is a detail view of the transmission mechanism and associated parts showing the reverse driving position. Fig. 3 is a view similar to Fig. 2 showing the transmission gearing in the idle position. Fig. 4 is a cross-section taken on a plane at about the line 4—4 of Fig. 1 looking in the direction of the arrow. Fig. 5 is a section taken on a plane at about the line 5—5 of Fig. 3 looking in the direction of the arrow; and Fig. 6 is a view partly in central longitudinal or axial section and partly in elevation of another form of the invention.

In the illustration a portion of an engine casing is shown at 10 which in practice houses the motor if a motor is employed at this portion of the mechanism. A casing 11 for housing the transmission mechanism is illustrated, to which housing is shown connected a portion of a container 12 which in practice in some instances is the drill stock. The container 12 is shown having a screw threaded end 13 connected to the end plate 14 of the housing 11.

The driven part or element of the structure illustrated is the spindle or driven shaft 15 carried by the casing or tool stock 12. The end of the spindle is shown extending into the housing 11.

The shaft 19 in the present illustration is the driving shaft or driving element of the mechanism. The shaft 19 is shown extending through the wall 20 which separates the housings 10 and 11, and through a suitable bearing, and into the housing 11.

The transmission mechanism in the present illustration is a self-contained ball bearing having a single set or series of balls and comprises an inner bearing member or ring 21 which is shown fast upon the driving element or shaft 19, an outer bearing member or ring 22, a series of rotary bodies, in the illustration a series of balls 23, between and bearing upon said members 21 and 22, and a cage 24 for such bodies, which cage will partake of the movement of the series of balls.

Assuming the inner member 21 to be fast upon the shaft 19 and to rotate therewith, if the outer member 22 is impeded in its rotation or held stationary, the series of balls and the cage 24 will rotate in a forward direction and at a reduced rate of speed, in the present showing about two and a half to one. If, on the other hand, the cage 24 is held from rotation during the rotation of the member 21, the outer member 22 will rotate in a reverse direction to the rotation of the member 21, and at a materially reduced rate of speed to the forward rotation of the driving element.

The ball cage in Fig. 6 is shown carrying a series of pins 25ª, and the spindle 15 carries a coupling for such pins, in the present instance a disk 26ª having a series of notches 27ª for receiving and engaging the pins 25ª.

In the form of mechanism illustrated in Figs. 1 to 5 inclusive the portion of the spindle or driven shaft 15 which extends within the housing 11 has splined upon it for longitudinal movement a sleeve 25, which sleeve carries a pin 26 for engaging pins 27 carried by the cage 24. These pins are for effecting a coupling between the spindle and the ball cage 24 for producing the forward drive of the spindle upon the rotation of the member 22 being impeded or stopped.

The controller shown in the illustration for effecting the various movements of the parts comprises a brake-pad 28 carried by a slide 29 mounted upon the housing 11 for reciprocation. The slide 29, which is the actuator in the illustration, carries a pin 30 running in a circumferential groove 31 in the head 32 of the sleeve 25 for moving the sleeve at the same time that the brake-pad is moved. The pins 27 are of sufficient length that the pin 26 remains in connection with them during the time the pad is on the braking surface of the member 28, see the Fig. 1 position of these parts, or when it is off such surface, see the Fig. 3 position.

The ball cage 24 carries on the rear side pins 33 for engaging a pin 34 carried by the slide 29 when the slide is moved forward to a sufficient extent that the pin 26 will clear the pins 27. The outer member 22 carries upon its front side pins 35 which at their rear portion are shown parallel and sufficiently far apart to permit the free rotation within them of the pin 26, but which are bent inwardly at their front ends 36 to such positions that upon the forward movement of the pin 26, after clearing the pins 27, engagement will be had between the ends 36 and the pin 26. In this position the cage 24 will be held against rotation, the member 22 will be free to rotate, and will rotate reversely to the direction of rotation of the shaft 19, and impart a reverse rotation to the spindle 15, the reverse rotation being at a greater rate of speed than the forward rotation.

It will be apparent that the form of device shown in the drawings and described herein is illustrative of the invention, and that changes may be made within the scope of the claims without departing from the spirit of the invention.

What I claim is:—

1. The combination with a series of rotary bodies and a cage revoluble therewith, of an internal and an external bearing member for such series of rotary bodies, a shaft connected to the internal bearing member, a shaft and means for connecting the same to the cage or to the external bearing member, and means for holding the other of these parts against rotation.

2. The combination with a series of rotary bodies and a cage revoluble therewith, of an internal and an external bearing member for such series of rotary bodies, a pair of shafts, one of the said shafts being connected to the internal bearing member, and means for coupling the other of the said shafts to the cage and stopping the rotation of the external bearing member, or for coupling the same to the external bearing member and stopping the rotation of the cage.

3. The combination with a series of balls, a cage therefor, and a shaft and means for connecting the same to the cage, of an internal and an external bearing member for the series of balls, a shaft connected to one of these members and a friction device for engaging the other member.

4. The combination with a series of balls, a cage therefor, and a shaft and means for connecting the same to the cage, of an internal and an external bearing member for the series of balls, a shaft connected to one of these members and means for preventing the rotation of the other member.

5. A transmission mechanism comprising a structure resembling in form a self-contained ball bearing, a driving element and a driven element, the driving element being connected to one member of the ball bearing, the driven element being connected to another member of said ball bearing, and means for impeding the rotation of the third element.

6. A transmission mechanism comprising a structure resembling in form a self-contained ball bearing, a driving element and a driven element, the driving element being connected to one member of the ball bearing, the driven element being connected to another member of said ball bearing, means for impeding the rotation of the third element, and an actuator for said rotation impeding means.

7. The combination with a series of balls, a cage therefor, and a shaft and means for connecting the same to the cage, of an internal and an external bearing member for the series of balls, a shaft connected to one of these members and a friction device for engaging the other member, and an actuator for the said rotation impeding means.

8. A transmission mechanism comprising a structure resembling in form a ball bearing, a driving element and a driven element, means for selectively connecting one of the said elements to one or another member of the ball bearing, means connecting the other element to another member of said ball bearing, and means for impeding the rotation of the third element of the said ball bearing.

9. The combination with a cage member having a series of rotary bodies, a pair of bearing members engaging opposite sides of said series of rotary bodies, a driving element, a driven element, one of said elements being connected to one of said members, means for coupling and uncoupling another of said members to the other of said elements, means for preventing the rotation of the third member, and an actuator for the said rotation preventing means.

10. The combination with a series of rotary bodies, of a cage therefor provided upon opposite sides with pins, of an internal and an external bearing member for such series of rotary bodies, said external bearing member being provided on opposite sides with pins, a driving shaft connected with the internal bearing member, a driven shaft, and a controller comprising a sleeve splined on the driven shaft and having pins for engaging the pins on the cage and on the said external bearing member upon reciprocation of the sleeve, a reciprocatory slide connected with said sleeve and carrying a brake for engaging the external bearing member when in one position and a pin for engaging the pins on one side of said cage when in another position, said controller being effective for coupling the driven shaft to the cage and stopping the rotation of the external bearing member, or for coupling the same to the external bearing member and stopping the rotation of the cage.

11. The combination with a casing, of a transmission mechanism contained therein and comprising two circular members having interposed between them a series of smooth surfaced rolling elements, a cage member engaging said rolling elements, means for driving one of said members, a driven part connected with another of said members, and the third member being connected to the casing.

In witness whereof, I have hereunto signed my name in the presence of two subscribing witnesses.

WILLIAM GENTRY SHELTON.

Witnesses:
CHAS. LYON RUSSELL,
FRED WHITE.